United States Patent
Boodoo

(10) Patent No.: US 8,663,476 B2
(45) Date of Patent: Mar. 4, 2014

(54) WATER SOFTENER REGENERATION

(75) Inventor: Francis Boodoo, King of Prussia, PA (US)

(73) Assignee: The Purolite Company, Bala Cynwyd, PA (US)

(*) Notice: Subject to any disclaimer, the term of this patent is extended or adjusted under 35 U.S.C. 154(b) by 728 days.

(21) Appl. No.: 12/365,856

(22) Filed: Feb. 4, 2009

(65) Prior Publication Data

US 2010/0193444 A1 Aug. 5, 2010

(51) Int. Cl.
*B01J 39/04* (2006.01)
*B01J 39/16* (2006.01)
*B01J 49/00* (2006.01)
*B01D 15/04* (2006.01)
*C02F 1/42* (2006.01)

(52) U.S. Cl.
USPC ............ 210/640; 210/660; 210/677; 210/687

(58) Field of Classification Search
None
See application file for complete search history.

(56) References Cited

U.S. PATENT DOCUMENTS

| | | | |
|---|---|---|---|
| 4,207,397 A | 6/1980 | Davis et al. | |
| 5,622,605 A * | 4/1997 | Simpson et al. | 203/10 |
| 5,695,643 A | 12/1997 | Brandt et al. | |
| 6,536,523 B1 | 3/2003 | Kresnyak et al. | |
| 6,666,971 B2 | 12/2003 | Chen | |
| 7,279,017 B2 | 10/2007 | Kresnyak et al. | |
| 7,428,926 B2 | 9/2008 | Heins | |
| 7,438,129 B2 | 10/2008 | Heins | |
| 2002/0179533 A1 | 12/2002 | Chen | |
| 2007/0095759 A1 | 5/2007 | Bridle | |
| 2007/0199900 A1 | 8/2007 | Zimmerman | |

OTHER PUBLICATIONS

Downey, Don. "High Total Dissolved Solids (HTDS) Produced Water Softening with Purolite Shallow Shell Technology Resins". Process Engineering Report. 2006.*
Fanaritis et al. "Review of Once-Through Steam Generators". Journal of Petroleum Technology. 1965. vol. 17, No. 4, pp. 409-416.*
Purolite SST80DL Product Data Sheet. 2007. <www.purolite.com>.*
Sykes et al. "Chemical Water and Wastewater Treatment Processes". 2003. CRC Press LLC.*
Downey, Don, Chemical Process Engineering Report, High Total Dissolved Solids (HTDS) Produced Water Softening with Purolite Shallow Shell Technology Resins, Purolite Canada, 9 pages.
Application Guide, Processing Engineering Report, Softening Methods of Water with High Total Dissolved Solids, Dec. 12, 2006, 7 pages.

* cited by examiner

*Primary Examiner* — Krishnan S Menon
(74) *Attorney, Agent, or Firm* — Fish & Richardson P.C.

(57) ABSTRACT

A new process for ion exchange softening of water used in Once-Through Steam Generators (OTSGs) by recovering and using the salt content of the blowdown water from the OTSG to regenerate the softener resin is provided, thus eliminating the cost for commercial regenerant salt that would otherwise be needed. Further, the very high purity of the salt recovered in the blowdown inherently results in the production of softened water with hardness leakage levels that are an order of magnitude lower than can be attained using commercial salt, thus reducing scale deposit potential and improving operating efficiency and reliability of the OTSG.

20 Claims, 6 Drawing Sheets

WATER SOFTENER REGENERATION

FIELD OF THE INVENTION

The present invention relates generally to regeneration of water softeners and more particularly to softener regeneration in Steam Assisted Gravity Drainage (SAGD) systems using once-thru steam generator (OTSG) boiler blowdown.

BACKGROUND OF THE INVENTION

Steam generation is used in heavy oil recovery operations since, in order to recover heavy oil from some geological locations, steam is necessary to increase the mobility of the oil before it can be pumped to the surface. Oil producers often use once-through (or once-thru) steam generators (OTSGs), as they are an essential part of the Steam Assisted Gravity Drainage (SAGD) processes for enhanced oil recovery of heavy oil deposits, such as from the tar sands region of Alberta, Canada. SAGD processes consist of a pair of horizontal wells drilled into the oil reservoir. Steam is injected into one of the wellbore to heat and reduce the viscosity of the oil; the oil is then collected in the second wellbore and brought to the surface. Approximately 3 barrels of water are needed for every barrel of oil produced.

SAGD processes typically make use of available brackish water in the early stages of the project to make steam. Later in the process, "produced water" (i.e., water obtained from a mixture of oil and water) is used to make steam. The OTSG uses this water after proper pretreatment to produce a mixture of steam and water which is then separated by steam-water separator vessels before the steam is injected downhole into the oil reservoir. OTSGs generally produce steam and water at a ratio of approximately 80% steam and 20% water. SAGD projects require 100% steam quality for efficient operation, so it is important to separate the water from the steam.

OTSGs typically generate steam at pressures of 8,000 to 15,000 kPa and therefore require excellent pretreatment of the water to avoid scaling and deposit problems on the heat transfer surfaces. As a result, feedwater to these boilers must typically have no more 0.2 ppm total hardness (TH) as $CaCO_3$, a maximum of 10 ppm of hydrocarbons, preferably less than 50 ppm of silica and less than 12,000 ppm total dissolved solids (TDS). Silica can complex with calcium, iron and other multivalent cations (e.g. barium, strontium and aluminum) to form hard encrusted deposits on the boiler heat transfer surfaces, thereby reducing heat transfer efficiency and increasing the potential for rupture and failure of the boiler. The lower the concentration of hardness and other multivalent cations in the boiler water, the lower the likelihood of formation of these complex deposits.

In SAGD processes, water pretreatment can include, for example, an oil removal process, hot or warm lime softeners, and one or more ion exchange processes, often operated in series as primary and polisher vessels or as a strong acid cation resin and a weak acid cation resin vessel. Dissolved calcium, magnesium, iron, barium, strontium and aluminum are exchanged onto the strong acid cation (SAC) resin with an equivalent amount of sodium released into the treated water. Upon exhaustion (breakthrough of hardness into the treated water), a liquid brine solution is used to regenerate the SAC resin. Large quantities of salt are generally consumed in the softening of high TDS water, requiring as much as 3 barrels of water to produce 1 barrel of oil. Therefore operating costs for salt can be substantial. Large amounts of dry salt must be purchased and delivered to remote locations in many cases. Large facilities for salt storage and brine solution makeup must be installed and operated. Additionally, labor for handling of salt can be significant. For example, typical salt usage can range from 6 to 15 lbs of salt per 1000 gallons of water softened, depending on the hardness content of the produced water and the design of the softener system. For producing 33,000 barrels of oil per day, it is necessary to soften about 100,000 barrels per day of produced or brackish water, requiring between 20,000 to 50,000 pounds of salt per day, or about 9,000 tons of salt per year. At the same time, discharge of such large quantities of spent salt brine represents a substantial burden on the environment.

It is thus desirable to provide ways to minimize the purchase and use of such large quantities of salt for regeneration while maintaining or even reducing hardness leakage from the softeners.

SUMMARY OF THE INVENTION

A new softener regeneration method is now provided.

One embodiment provides a method of regenerating resin in an ion exchange water softener in a system containing a Once-Through Steam Generator (OTSG) and an ion exchange water softener comprising:
 recovering water concentrated as a blowdown stream from the OTSG, and
 regenerating the resin in the ion exchange water softener by flowing the blowdown stream through the ion exchange water softener.

In one embodiment, the ion exchange water softener is a sodium cycle water softener. Since the blowdown stream coming from the boiler is heated, the invention also comprise reducing the temperature of the blowdown stream using a heat exchanger. In one embodiment, the temperature is reduced to less than 95° C.

The system may contain any of a variety of apparatus for filtering or otherwise cleaning the produced or brackish water. In one embodiment, the system contains an oil removal apparatus, a Hot Lime Softener (HLS), an after filter, an ion exchange apparatus, and a polisher. In one embodiment, the system does not include a lime softener (either a HLS. WLS, or any other lime softener). In this embodiment, the addition of a lime softener is unnecessary due to the advantageous properties of the presently claimed invention.

In one embodiment, the resin in the ion exchange water softener comprises a standard strong acid cation resin. This resin may be, for example a shallow shell resin (such as Purolite SST80DL), a macroporous polystyrene resin crosslinked with divinylbenzene having sulphonic acid functional groups, or a gel polystyrene resin crosslinked with divinylbenzene having sulphonic acid functional groups.

In one embodiment, the ion exchange resin has less than 1.0 ppm hardness leakage after regenerating the resin in the ion exchange water softener. In another embodiment, the resin has less than 200 ppb hardness leakage and in yet another embodiment, the resin has less than 50 ppb hardness leakage.

In one embodiment, regenerating the resin comprises regenerating in a counter-flow mode and in another embodiment, regenerating the resin comprises regenerating in a co-flow mode.

In one embodiment, the system comprise at least two water softener vessels, wherein the water softener vessels are operated in an alternating mode.

In an embodiment of the present invention, a method of regenerating resin in an ion exchange water softener is provided. This method comprises:

recovering water concentrated as a blowdown stream from a Once-Through Steam Generator (OTSG); and regenerating the resin in the ion exchange water softener by flowing the blowdown stream through the ion exchange water softener.

This embodiment may be such that an ion exchange water softener is not directly or indirectly connected to the Once-Through Steam Generator.

Another embodiment includes a method for reducing the amount of salt additives and wastewater in a steam-based enhanced oil recovery process, wherein the process includes an ion exchange water softener and a Once-Through Steam Generator (OTSG) comprising:

recovering water concentrated as a blowdown stream from the OTSG, and regenerating the resin in the ion exchange water softener by flowing the blowdown stream through the ion exchange water softener, wherein a regenerant brine containing an effective amount of purchased salt is not added to the system for regeneration of the strong acid cation resin.

Yet another embodiment includes a system comprising:
(a) produced or brackish water having total dissolved solids of between 1000-250,000 ppm
(b) an ion exchange apparatus for reducing water hardness of the produced or brackish water containing an ion exchange resin;
(c) a Once-Through Steam Generator (OTSG);
(d) a separator apparatus that separates the output of the OTSG into steam and a blowdown stream;
(e) a heat exchanger that reduces the temperature of the blowdown stream;
(f) a plurality of flow control valves operatively connected to the ion exchange apparatus and the heat exchanger, wherein the flow control valves are configured to control the flow of the blowdown stream through the ion exchange apparatus to regenerate the ion exchange resin.

The blowdown stream of this system may flow through the ion exchange apparatus in a direction opposite from the flow of the produced or brackish water. The system may also be adapted to regenerate the ion exchange resin to have a hardness leakage of less than 200 ppb.

BRIEF DESCRIPTION OF THE DRAWINGS

Non-limiting and non exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention makes use of the salt naturally present in the brackish or produced water, allowing operators of softening systems to:
(1) reduce and preferably eliminate the cost associated with the purchase and handling of large amounts of bulk salt for regeneration of the softeners,
(2) achieve lower levels of hardness leakage previously considered unattainable for salt regenerated softeners, and/or
(3) minimize and preferably eliminate additional burden on the environment from discharge of commercial salt.

Figure 1:
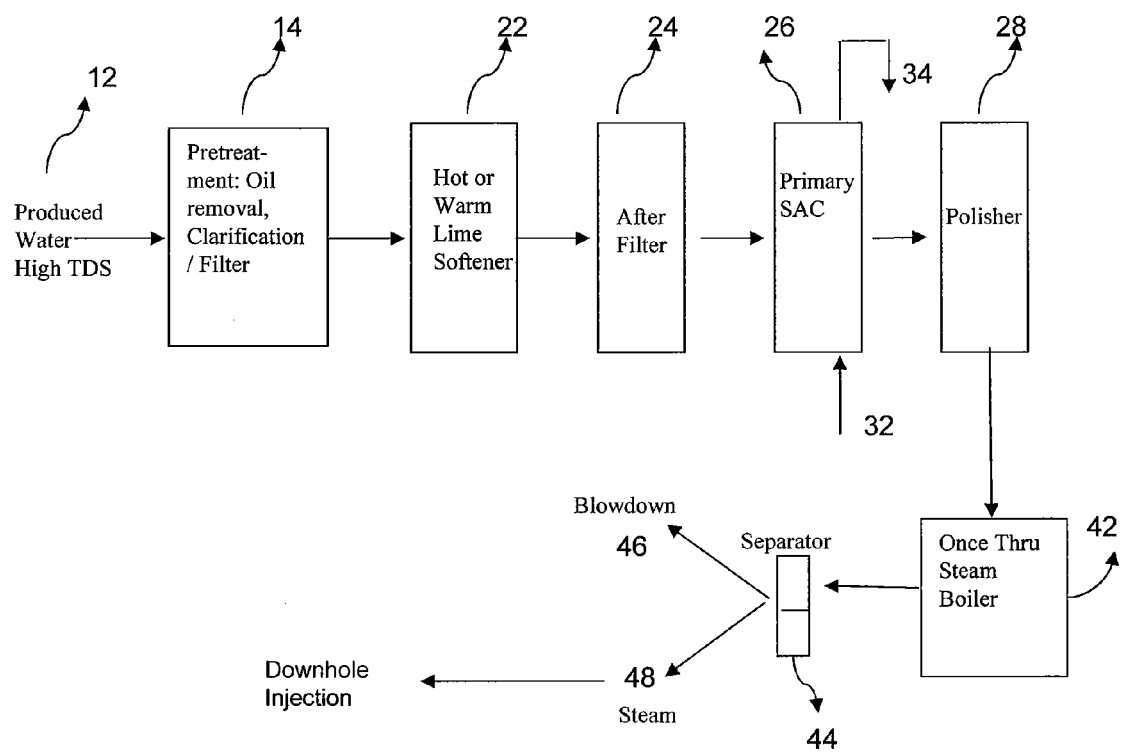
FIG. 1 shows a typical high TDS treatment scheme for steam production.

In a typical SAGD process, as shown in FIG. 1, pretreatment of the high TDS water for the OTSG (12) will typically include an oil removal process (14) followed by a hot or warm lime softener (HLS or WLS) (22) for silica removal and some partial removal of hardness. The water is then passed through an after filter (24) to remove any carryover sludge from HLS or WLS. This is followed by at least one ion exchange process (26) and (28) to reduce total hardness (TH) to less than the 0.2 ppm target. Typically two ion exchange vessels, using strong acid cation (SAC) resins operating on a sodium cycle, are operated in series as primary (26) and polisher (28) vessels to ensure that the hardness target is met.

Non-limiting examples of suitable SAC resins include Purolite® C100 and Purolite® SST80DL shallow shell resin. In order to obtain low hardness leakage with a SAC softener operating on high TDS water it is necessary to use high dosages of sodium chloride (salt), typically ranging from 15 to 30 lbs salt per cubic foot of resin (240 to 480 g/l).

The presence of each of the HLS (22), after filter (24), and polisher (28) or optionally other filters such as a WAC in the system independently depend on the content of the produced high TDS water or brine (12) entering the boiler. Additional filters or softeners, either the same or different from those described in FIG. 1 may also be used. For waters with higher TDS (generally higher than 5000 ppm), the second polisher vessel is typically replaced by a weak acid cation (WAC) resin (28) operating in the sodium form in order to achieve the maximum target of 0.2 ppm TH.

In preparation for regeneration of SAC resins in the methods in the prior art, a liquid brine solution (32) is usually made up onsite from dry sodium chloride purchased either in the form of rock or solar salt. The accepted practice is to use a brine concentration of 10% or higher, or salt dosage of usually 15-25 lb/ft$^3$ of resin. On passage of the brine through the resin bed, calcium, magnesium and other divalent cations are displaced from the resin in exchange for sodium. SAC resins can either be operated in co-flow mode, with the water and brine entering and exiting the ion exchange vessel in the same direction, or in counter-flow mode, with water and brine entering the vessel in opposite directions.

In a preferred embodiment, counter-flow is preferred for achieving the lowest hardness leakage as the freshest brine makes first contact with the volume of resin at the end of the vessel from which the softened water exits when the vessel is next placed into service. This means that the resin where the brine enters gets maximum regeneration efficiency and residual hardness ions left over in the resin will be at a minimum. When the vessel is put into service, the softened water leaving the vessel makes last contact with this highly regenerated resin and thus desorption of hardness (i.e. leakage) into the water during the next service cycle is kept to a minimum. Counter-flow operation can therefore use a lower dosage of salt compared to co-flow operation and is widely used for high TDS applications in the oil field.

Regeneration of the WAC unit is more complicated, requiring the use of increasingly more of the following: expensive acids and caustic, costly specially lined vessel internals, operator attention, and a generally increased complexity of operation.

The interstices of oil or gas producing formations usually contain high TDS water or brine in addition to the oil and/or gas. The pressure gradient created by the production of an oil or gas well causes the brine to also flow to the well bore. In systems using an OTSG, the brine can be used as a source for producing the steam used to inject into the wellbore to heat and reduce the viscosity of the heavy oil.

The TDS of brackish and produced water generally ranges from 2,000 to 8,000 ppm and even higher. For purposes of this invention, it should be recognized that this TDS is largely sodium chloride, along with a few hundred ppm of calcium, magnesium and silica. SAC resins used in softening remove dissolved divalent cations such as calcium, magnesium, barium, iron, and manganese from the water and replace them with sodium. Thus the water after softening, apart from the small amount of hardness leakage, is comprised largely sodium salts (e.g. chloride, sulfate, bicarbonate) with sodium chloride being the major fraction.

Regeneration of SAC resins require sodium chloride brine concentrations that are much higher than the TDS of the water that has been softened as it is necessary to have a high enough chemical driving force to reverse the ion exchange process of displacing divalent cations by monovalent sodium. Under dilute brine conditions the softening resin has a higher selectivity or attraction for divalent cations (e.g. calcium and magnesium) compared to sodium. Selectivity of the resin for divalent cations reverses as the TDS concentration of the brine increases. For this reason the accepted practice is to use brine concentrations of 10% or higher. Compared to the influent TDS of 2,000 to 8,000 ppm, 10% brine equates to 100,000 ppm, thus providing the necessary driving force considered necessary to properly regenerate the resin while utilizing a minimum quantity of brine.

Adequate quantities of salt are present in high TDS waters; once this salt is concentrated it can be efficiently used for regenerating the sodium cycle SAC resin used to pre-soften the water used in the OTSG boilers. The salt concentrating mechanism inherent in the design and operation of the Once-Through Steam Generator (OTSG) boiler used in SAGD operations can be used to provide a sufficiently concentrated salt solution for regeneration of the SAC resin.

An essential feature of the SAGD process is the requirement for steam quality to be close to 100% for efficient operation, meaning that (liquid) water content of the steam must be as low as practical. OTSG boilers by design produce a mixture of steam and water at a typical ratio of 80% to 20% respectively. It is therefore necessary to separate the steam from the water before it can be injected into the oil reservoirs. This separation is done via the steam-water separator vessels located downstream of the boiler. These steam separator vessels bring the steam to near 100% quality by separating out the water into what is referred to as a blowdown stream. This blowdown stream comprises approximately 20% of the total water originally fed to the boiler. Essentially all of the dissolved solids (TDS) originally present in the feed water to the OTSG boiler ends up in the 20% fraction that comprises the blowdown water. This amounts to a concentration factor of 5 times the TDS present in the feedwater to the boiler.

For example, the TDS of typical produced water may range from 2,000 ppm to 8,000 ppm, or approximately 0.2% to 0.8% (1% equates to 10,000 ppm). Such a water typically contains 100 ppm to 300 ppm total hardness (expressed as $CaCO_3$) while the majority of the remaining cation content will be sodium. On passage of this water through a regenerated cation exchange water softener, the total hardness is picked up by the softener and an equivalent amount of sodium is released in to the water. Thus, the cation content of the water leaving the water softener in this example is essentially sodium. For a feedwater TDS of 5,000 ppm, the five times concentrating mechanism of the OTSG results in a concentration of 25,000 ppm TDS in the boiler blowdown (or 2.5% concentration), essentially all of which is sodium chloride.

When the above 2.5% brine concentration is compared to the industry standard of using a 10% sodium chloride brine solution (100,000 ppm) it can be seen that the industry standard is 4 times higher. However, this common industry practice of using 10% or higher brine concentration does not strictly apply when salt is freely available, as is the case with the solutions of the present invention. When salt is freely available, it is practical to use much lower concentrations of brine and to still achieve quite satisfactory regeneration efficiency. The freely available salt found in the blowdown is sufficient to compensate for the expected loss in efficiency at lower brine concentrations. The excess of salt available for regeneration of the softeners by concentrating and recovering the salt via the blowdown mechanism from the OTSG boiler is sufficient to regenerate the SAC. Even though the concentration of salt in the blowdown is low by current standards, the quantity of salt available in the boiler blowdown effectively represents a much larger quantity and dosage (usually about 3 times higher) than used in current practice.

The high purity of the salt solution available from the blowdown from the OTSG and its positive impact on the process of pre-softening the water used in the boiler with SAC softeners compared to commercially available salt is a particularly useful benefit in the present invention. For example, 10% brine made from commercial salt may contain hardness ranging from 200 to 2000 ppm whereas the hardness content of the brine available in the blowdown from the OTSG will generally be 1 ppm. Using the much higher purity OTSG brine to regenerate the softener will result in very low levels of hardness leakage, in fact, much lower than what can be obtained when regenerating the softener with commercial sources of salt. For example, hardness leakage of 40 ppb or lower is possible with the invention compared to 1 to 8 ppm with various grades of commercial salt.

FIG. 1 outlines a typical conventional treatment train and a modified treatment train of the present invention, showing the recovery and reuse of the blowdown from the OTSG boiler for softener regeneration. Produced water or brackish water (12) is typically subjected to a number of unit operations for cleanup of the water before it is used in the boiler, including deoiling (14), warm lime softening (22), filtration (24), sodium cycle softening (26) using brine as regenerant and then weak acid cation softening for final polishing (30) before entering the OTSG boiler (42) and then the steam-water separator (44). Although a weak acid cation polisher is shown for vessel (30), this can be replaced by a second sodium cycle softener for polishing in cases where the TDS is on the lower end of the 2,000 to 15,000 ppm TDS range, such as would be the case for brackish water (for example, 2,000 to 5,000 ppm).

In the warm lime softener (22) shown, lime, magnesium and a polymer flocculent may be added to reduce silica, suspended solids, residual oil, and to partially soften the water by precipitation of any temporary hardness that may be present. A simple filter downstream of the clarifier serves to remove any residual suspended solids that may get carried over from clarifier.

Remaining hardness after the warm lime softener, typically about 200 to 300 ppm, is largely removed by a sodium cycle water softener (26), with average leakage of hardness from the unit typically ranging from about 5 to 15 ppm total hardness as $CaCO_3$. Operating capacity is generally about 20 to 30 kilograms of hardness per cubic of resin (or about 0.9 to 1.4 equivalent of hardness per liter of resin). On exhaustion, the softener is taken offline and a 10% brine solution (or higher) is passed through the resin at total volumes that corresponds to dosage of 15 to 25 lbs of sodium chloride salt per cubic foot of ion exchange resin (240 to 400 grams NaCl per liter of resin), either in co-flow but more preferably in counter-flow mode of operation. For an influent total hardness of 200 ppm as $CaCO_3$ and a salt dosage of 15 lbs/ft$^3$ (240 grams NaCl per liter of resin), this would correspond to a service cycle volume of treated water of approximately 275 bed volumes of water based on the volume of resin in the softener, or removal of 1.1 equivalents of hardness per liter of resin. (Note 1 bed volume equals a volume of water equals to the volume of resin in the vessel). For example, 1 liter of resin would treat 275 liters of water before hardness leakage rises to the defined breakthrough point at which time it is taken offline and regenerated with brine. For a salt dosage of 15 lbs/ft$^3$ of resin (240 grams NaCl/liter of resin), this corresponds to a dosage of 4.1 chemical equivalents of NaCl per liter of resin. Thus the equivalent usage ratio of sodium chloride to total hardness removed is 4.1/1.1, or 3.7/1. Once the brine solution is used, the spent brine is removed as waste (32).

Figure 2:
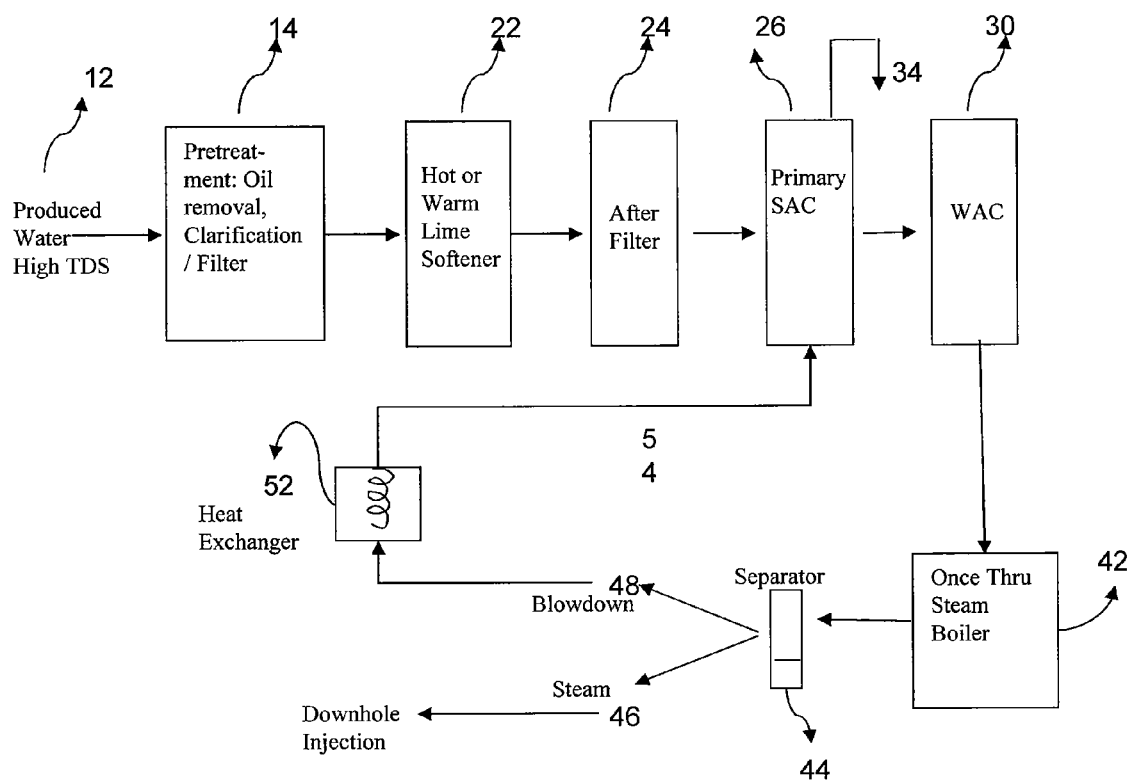
FIG. 2 shows a high TDS treatment scheme according to the present invention.

FIG. 2 further exemplifies the regeneration process of one embodiment of the present invention showing the recovery of the boiler blowdown (48), first cooling via a heat exchanger (52) (e.g. a heat exchanger used for pre-heating the feedwater before it enters the boiler) to a temperature close to typical operating temperatures of the softener at about 80 to 95° C.; then passage of the blowdown water (54) containing the sodium chloride through the resin to regenerate it. In the example shown, the brine concentration in the blowdown will typically range from 1% to 3.5% depending on the TDS in the influent water. In the embodiment wherein a second sodium cycle softener is used as the polisher (28) (instead of the weak acid cation resin), the brine can be used to regenerate this sodium cycle softener as well. In one embodiment, the brine is passed through the polisher vessel first in counter-flow mode and is then routed to the primary softener, in what is known as thoroughfare regeneration.

This higher available salt amounts to "free regenerant" that can be used to further improve the performance of the softener and hence to provide even lower leakages than would be economically feasible if salt had to be purchased. By use of this excess free regenerant, it is expected that the hardness leakage from the primary softener will be reduced to values that are a small fraction of that obtainable from softeners that rely on purchased salts. Commercial salts typically have impurities of calcium at levels up to about 1.5%. This impurity essentially determines the lowest calcium leakage that can be obtained from a softener. For example, one study using brackish water at about 9,000 ppm showed that using pure salt (no calcium impurities) for counter-flow regeneration would give a hardness leakage of 0.2 ppm. Predicted leakage based on commercial salt with 0.5% calcium impurity was 5 ppm total hardness. Field results showed average leakage was actually closer to 6 to 7 ppm hardness leakage.

Use of salt recovered from the blowdown of the OTSG boiler does not suffer from this limit on hardness leakage since the hardness in the blowdown is initially dictated by the purity of the regenerant salt used and ultimately by the equilibrium conditions between the resin, sodium and hardness ions that are present in the water. The hardness content of the blowdown brine is in fact dictated by the leakage of hardness from the softeners. But the hardness leakage from the resin bed is dependent on the trace level of calcium and magnesium that are left on the portion of the resin that makes last contact with the water leaving the ion exchange vessel. Residual hardness on the resin in turn depends on the hardness in the brine itself. With commercial sources of brine (rock salt etc.), containing about 1.5% or 15000 ppm of calcium (or about 1500 ppm for a 10% brine solution), a significant amount of calcium is left on the resin, and this dictates the hardness leakage. This is not the case, however, with brine recovered from the OTSG boiler as this brine will contain no more than 1 ppm of calcium hardness once the system is operating within specifications. This is easy to see since the hardness in the softened water is controlled at no greater than 0.2 ppm of hardness. After the 5 times concentration effect that occurs in the OTSG boiler (with 80% steam, 20% water produced), the hardness concentration will be no more than 1 ppm once the softener is well controlled. Even with upsets in control, the hardness content of the blowdown brine used for regeneration will be a minute fraction of the typical 1500 ppm that is found in brine made from commercial salt.

In essence, use of blowdown salt to regenerate the upstream softener can represent an order of magnitude improvement in hardness reduction efficiency that cannot be achieved with commercial salt.

Figure 3:
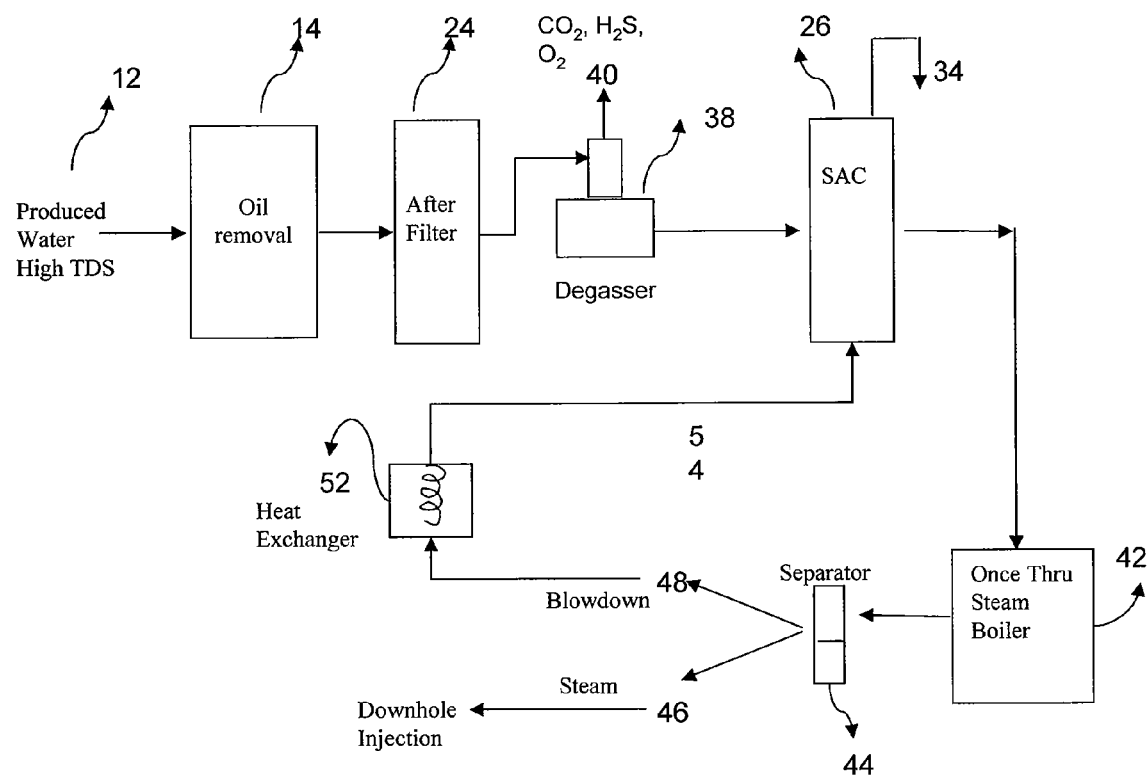
FIG. 3 shows a second high TDS treatment scheme according to the present invention.

FIG. 3 exemplifies another embodiment of the present invention showing either produced water or brackish water (12) subjected to a number of unit operations for cleanup of the water before it is used in the boiler (42), including deoiling (14), filtration (24), degassing (36), and sodium cycle softening (26). The degassing step (36) generally removes $CO_2$, $H_2S$ and $O_2$ (40) from the water. The cleaned water enters the OTSG boiler (42) and then the steam-water separator (44) where steam (46) is produced for use it the downhole injection site. The separator (44) also produces boiler blowdown (48), which is recovered and cooled via a heat exchanger (52) and then passage of the blowdown water (54) to the SAC (26) to regenerate the SAC.

Additional components or modifications used in OTSG or related systems may also be used. For example, the reduction of divalent and trivalent cation concentrations to reduce silica-based compound scaling and/or the removal of a lime softener may be accomplished, for example, by using the method as described in U.S. Pat. Appl. Pub. No. 2007/0095759, herein incorporated by reference.

Figure 4:
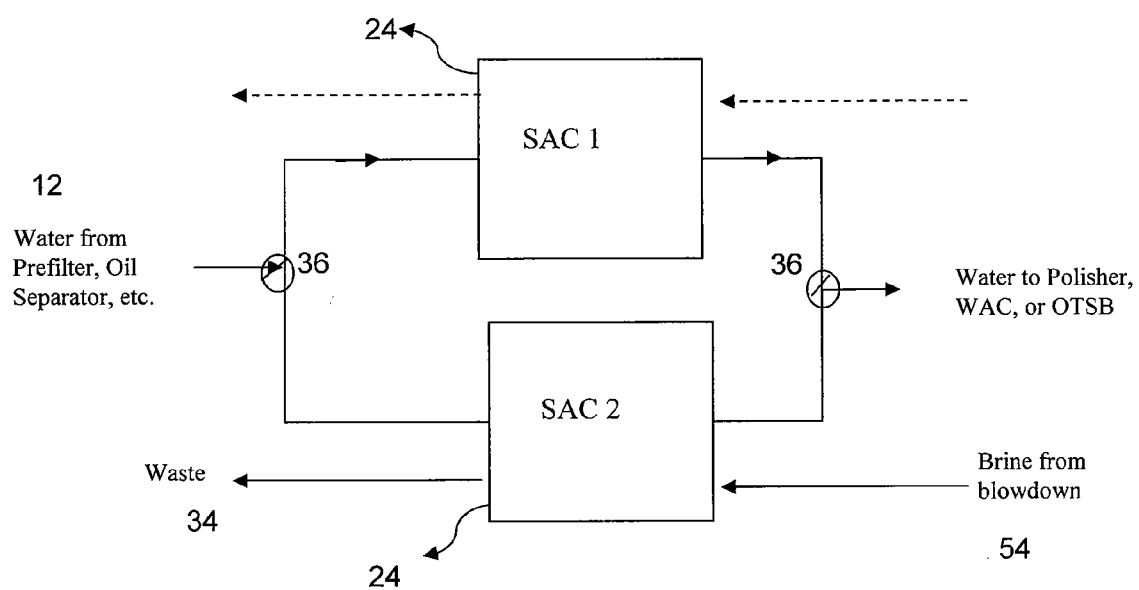
FIG. 4 shows an embodiment having two SAC resins.

In one embodiment of the present invention, as shown in FIG. 4, a minimum of 2 primary sodium cycle softener units (24) are operated in parallel, with one in service and the other on standby or being regenerated. While unit 1 (SAC 1) is in service, unit 2 (SAC 2) can be regenerated with the recovered blowdown from the boiler (54), essentially amounting to a flip-flop switching of the two unit from service to regeneration and back, with the appropriate valving and controls (36). In one particular embodiment, counter-flow regeneration (down-flow service and upflow regeneration, or vice versa) is the preferred method of regeneration as it will yield the lowest hardness leakage. Co-flow regeneration (in which both service flow and regenerant pass through the vessel in the same direction) can work but not as efficiently as counter-flow, but does offer a more simplified vessel design and is thus part of another embodiment of the present invention.

In one embodiment of the present invention, where efficiency is optimized, the hardness removed is largely loaded on the portion of the resin volume that is close to the influent point of the vessel. Regeneration is performed frequently enough to avoid loading hardness on the portion of resin closest to the exit point for the softened water. In this embodiment, the exit resin volume contains only the hardness loaded from the brine during the regeneration phase, which will be nominal considering the hardness in the regeneration brine is generally less than 1 ppm TH. Thus, in this embodiment, a deeper resin bed is desirable while lower specific loading rates for the resin bed are advantageous. More frequent regeneration can be used for increasing raw water TDS and total hardness as the added competition for ion exchange sites will tend to push hardness deeper within the resin bed.

Ion exchange equilibrium theory, combined with the known quality of various grades of commercial salt, can be used to show the expected hardness leakage when the softener is operated in counter-flow mode. In ion exchange softening, divalent ions such as calcium and magnesium are exchanged for sodium ions on the cation resin, R, according to the reaction:

$$2NaR + M^{+2} \rightleftharpoons MR_2 + 2Na^+ \quad (1)$$

The double arrows indicate that the reaction is reversible and the resin can be regenerated by contacting it with a concentrated solution of sodium chloride. The reaction can be described mathematically by using a term called the equilibrium constant, $K^{M+2}{}_{Na}$, to show the tendency for exchange to occur as in the following equation:

$$K^{M+}{}_{Na} = (Ca^{+2}{}_r) \cdot (Na^+{}_s)^2 / (Na^+{}_r)^2 \cdot (Ca^{+2}{}_s) \quad (2)$$

where $Ca^{+2}{}_r$ and $Ca^{+2}{}_s$ represent the concentration of calcium in the resin and water phases and $Na^+{}_r$ and $Na^+{}_s$ represent the concentration of sodium in the resin and water phases. This can be reduced to a more manageable equation using equivalent fractions as shown in equation 3 below:

$$H_r/(1-H_r)^2 = K^{M+}{}_{Na} \cdot (C_r/C_o) \cdot H_s/(1-H_s)^2 \quad (3)$$

where r and s are the resin and water phases respectively,
$H_r$ and $H_s$ are the equivalent fractions of divalent ions in the resin and water phases respectively,
$C_r$ and $C_o$ are the ion exchange capacity and TDS expressed as ppm $CaCO_3$ of the resin and water respectively,
$K^{M+}{}_{Na}$ is the equilibrium constant for the specific divalent ion versus sodium, and
$C_r$ for common SAC resins is generally equal to 2 eq/l or 2000 mg/l as $CaCO_3$.

Assuming molar selectivity coefficient of 2 for $Mg^{+2}$ vs. $Na^+$ and 5 for $Ca^{+2}$ vs. $Na^+$, or an average value for both of 3 for typical mixed water, then Equation 3 reduces to:

$$H_r/(1-H_r)^2 = 300,000/C_o \cdot H_s/(1-H_s)^2 \quad (4)$$

Using equation 4 above, the composition of the resin at the exit point for the softened water from the ion exchange vessel can be calculated for counter-flow regeneration as the hardness left on the resin in that region of the bed is directly related to the hardness composition of the brine used for regeneration.

For example, the impact on hardness leakage in using various grades of salt with varying levels of hardness impurity can be calculated. Table 1 below shows typical composition for commercial rock salt, solar salt and vacuum salt, with all values in percentage and expressed as ppm $CaCO_3$.

TABLE 1

Typical composition of various grades of commercial salt

| | Rock Salt % | Rock Salt % as ppm $CaCO_3$ | Solar Salt % | Solar Salt % as ppm $CaCO_3$ | Vacuum Salt % | Vacuum Salt % as ppm $CaCO_3$ |
|---|---|---|---|---|---|---|
| NaCl | 98 | 83.79 | 98 | 83.79 | 98 | 83.79 |
| $CaSO_4$ | 0.80 | 0.588 | 0.23 | 0.169 | 0.27 | 0.198 |
| $CaCl_2$ | 0.52 | 0.4784 | .17 | 0.156 | 0.02 | 0.018 |
| $MgCl_2$ | 0.26 | 0.2738 | 0.12 | 0.126 | 0.008 | 0.0084 |
| % TH | | 1.574% | | 0.536% | | 0.267% |
| ppm TH in 10% brine | | 1606 | | 547 | | 273 |

In one analysis, two steps are followed to assess the impact of brine purity used for regeneration on the hardness leakage in the subsequent service cycle, the first being to calculate the composition of the resin at the exit of the bed, second being to use that resin composition to calculate the leakage that will occur for a given TDS in a given water.

In one example, assume the TDS of the water is 6000 ppm expressed as $CaCO_3$; also assume a typical brine concentration of 10% as NaCl or 8.547% when expressed as $CaCO_3$ or 85,470 ppm as $CaCO_3$.

In the first step using equation 4 above, calculating the composition of the resin when using rock salt for regeneration provides:

$$H_r/(1-H_r)^2 = 300,000/85470 \cdot (0.01879/(1-0.01879)^2$$

$$H_r/(1-H_r)^2 = 0.06850$$

In the second step, calculating the expected leakage from the raw water during service with a TDS of 6,000 ppm as $CaCO_3$ provides:

$$0.06850 = 300,000/6000 \cdot H_s/(1-H_s)^2$$

Solving this for Hs provides:
Hs=~0.00137=fraction of the raw water TDS=8.2 ppm total hardness.

The above demonstrates that the lowest total hardness leakage that can be achieved using commercial grade rock salt with the composition shown in table 1 is 8.2 ppm TH leakage when operating in counter-flow mode.

Using solar salt or vacuum salt instead of rock salt with compositions shown in Table 1 and same conditions as above for rock salt, the corresponding minimum hardness leakages expected are 2.7 ppm and 1.4 ppm respectively.

Comparatively, the present invention, when the blowdown is used, provides a lower hardness leakage than can be obtained using the commercial salt sources described above. In one embodiment of the present invention, hardness leakage is controlled at no more than 1 ppm total hardness in the softened water being fed to the OTSG boiler considering the 5 times concentration that occurs within the OTSG. In another embodiment, the hardness leakage is no more than 0.6 ppm. In another embodiment, the hardness leakage is no more than 0.2 ppm. In another embodiment, the hardness leakage is no more than 0.1 ppm. In another embodiment, the hardness leakage is no more than 50 ppb.

Assuming a softened water TDS of 6000 ppm as $CaCO_3$, then the TDS of the OTSG blowdown is 30,000 ppm for 80%/20% steam/water production. So applying equation 4 above, the minimum hardness exiting the SAC softener is calculated as follows:

$$H_s = 1/30,000.$$

Thus $H_s/(1-H_s)^2=0.000033$ $$H_r/(1-H_r)^2=300{,}000/30000\cdot(0.000033/(1-0.000033)^2=0.00033$$

Now using the above resin condition to calculate the minimum hardness leakage expected when treating a 6,000 ppm TDS water in counter-flow provides:

$$0.000033=300{,}000/6000\cdot H_s/(1-H_s)^2$$

Thus, $H_s=0.000067$.

Therefore, the calculated minimum hardness leakage for this embodiment is $=0.000067\times6000=0.040$ ppm (40 ppb).

Thus this embodiment of the invention provides an order of magnitude lower hardness leakage compared to current technology using brine regenerable strong acid cation resin.

Another embodiment of the present invention includes using higher TDS water to be softened. This can be done while minimizing the need for polisher vessels using weak acid cation (WAC) resin. Thus, operating costs can be reduced since acid and caustic are several times more expensive than salt, and the cost of removing hardness using brine regenerable resin is significantly lower.

For example, SAC resins use approximately 240 g/l NaCl with an average capacity of approximately 1.1 eq TH per liter of resin or approximately 218 g/l of NaCl per 1 eq TH.

WAC resin typically operate at approximately 1.3 eq TH per liter of resin and use approximately 224 g HCl acid and 240 g NaOH per liter of resin, equal to 172 g/l HCl and 185 g/l NaOH per 1 eq TH. The cost for chemicals to regenerate WAC resin is about seven times more than that for regenerating SAC resins.

Therefore, reducing SAC resin leakage to less than 0.2 ppm TH eliminates the operating cost for the WAC resin to polish the extra leakage that would otherwise be produced by the current SAC technology using commercial salt.

Any decision to keep or eliminate WAC polisher systems must however be balanced by the fact that oil intrusion into the resin beds do occur in practice due to upsets in control ahead of the resin beds. When these upsets occur, hardness removal can be compromised in the primary ion exchange vessel and the polisher vessel must be relied upon to take up the extra hardness loading and achieve the target hardness value needed for the softened water. In such a case, having the WAC regenerated with caustic, acid and then caustic again can be effective in cleaning up the WAC resin of any oil that does get through to the polisher vessel. Thus, in some embodiments of the present invention, WAC polishers are advantageous to use.

Any resin known in the art of water softening and oil recovery may be used as the SAC resin. An exemplary strong acid cation resins that may be used is Purolite® C100. Purolite® C100 is a gel cationic resin of polystyrene crosslinked with divinylbenzene having sulphonic acid functionality.

In one embodiment, the resin is a shallow shell resin. Shallow shell resins, which may also be referred to as a shell and core resin or a shell-core resin, offer greater efficiency of regeneration than conventional resins due to the inert core of the resin, and are thus preferred in some embodiments of the present invention. Shallow shell resins eliminate the residual hardness that otherwise accumulates deep within the beads of conventional resin since these resins do not have a functionalized core area. Therefore, for some demanding applications, shallow shell resins are preferred. Exemplary shallow shell resin that may be used include the Purolite® SST family of resins, and particularly include Purolite® SST80DL. Purolite® SST80DL is a gel polystyrene resin crosslinked with divinylbenzene. The spherical beads are functionalized only at the surface of the resin with sulphonic acid functional groups and have a reduced depth of penetration which allows for a more complete regeneration and provides a higher, more efficient utilization of the regenerant. Shallow shell resins have high salt efficiency, lower leakage, and reduced rinse water requirements when compared to conventional softening resins.

Abbreviations and Definitions

The following abbreviations are used throughout the specification:
BV bed volume
HLS hot lime softener
OTSG Once-Through Steam Generator or equivalently Once-Thru Steam Generator
SAC strong acid cation
SAGD Steam Assisted Gravity Drainage
TDS total dissolved solids
TH total hardness
WAC weak acid cation
WLS warm lime softener Unless defined otherwise, all technical and scientific terms used herein generally have the same meaning as commonly understood by one of ordinary skill in the art to which this invention belongs. Generally, the nomenclatures used herein are those well known and commonly employed in the art. The techniques and procedures are generally performed according to conventional methods in the art and various general references. The nomenclature used herein and the procedures in oil recovery and polymer chemistry described below are those well known and commonly employed in the art.

As used herein, the term counter-flow when used for resin regeneration means that the water being treated by the resin and the brine used for regeneration of the resin enter and leave the softener apparatus in opposite directions.

As used herein, the term co-flow, when used for resin regeneration, means that the water being treated by the resin and the brine used for regeneration of the resin enter and leave the softener apparatus in the same direction.

As used herein, a means for generating produced water includes the process within oil recovery wherein water produced along with oil in SAGD and subsequently separated from it. A means for generating this water includes obtaining the oil/water mixture from the wellbore and separating the water from the oil. The means for generating produced water also includes obtaining and directing brackish water, which is usually used within the early stages of a project, which is commonly available at the oil-recovery site and appropriate for use after proper pretreatment, to produce a mixture of steam and water in an OTSG.

As used herein, an effective amount of salt in a system for regeneration of a SAC resin is an amount of salt sufficient to regenerate the resin such that the salt Na+ ions are exchanged in the resin to produce sufficiently low hardness leakage for the intended purpose of the resin.

The term "about" or "approximately" means within an acceptable error range for the particular value as determined by one of ordinary skill in the art, which will depend in part on how the value is measured or determined—e.g., the limitations of the measurement system, or the degree of precision required for a particular purpose. For example, "about" can mean within 1 or more than 1 standard deviations, as per the practice in the art. Alternatively, "about" can mean a range of up to 20%, preferably up to 10%, more preferably up to 5%, and more preferably still up to 1% of a given value. Where particular values are described in the application and claims, unless otherwise stated, the term "about" meaning within an acceptable error range for the particular value should be assumed.

As used herein and in the appended claims, the singular forms "a," "an," and "the," include plural referents unless the context clearly indicates otherwise. Thus, for example, reference to "a molecule" includes one or more of such molecules, "a resin" includes one or more of such different resins and reference to "the method" includes reference to equivalent steps and methods known to those of ordinary skill in the art that could be modified or substituted for the methods described herein.

All U.S. patents and published applications cited herein are hereby incorporated by reference.

EXAMPLES

The following examples are included to demonstrate preferred embodiments of the invention. It should be appreciated by those of skill in the art that the techniques disclosed in the examples, which follow, represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Part A

A Steam Assisted Gravity Drainage system having a Once-Through Steam Generators (OTSGs) has the following parameters:

Influent water TDS—4000 ppm as $CaCO_3$;
Sodium chloride content—3800 ppm as $CaCO_3$ (76 meq NaCl per liter);
Total Hardness—200 ppm as $CaCO_3$ (4 meq total hardness per liter of water);
Conventional Softener operating capacity: 300 bed volumes (BVs) in a vessel containing Purolite® C100 (or, optionally, the SAC vessel contains Purolite® SST80DL);
(1 bed volume of treated water is equal to 1 volume of resin used to treat the water)
Hardness leakage is estimated at no greater than 1 meq/l or 50 ppm as $CaCO_3$ based on softener design tables available from Purolite for Purolite C100®
Net quantity of hardness exchanged onto the resin: 300BVs×3 meq/l=900 meq per liter of resin;
A conventional SAC water softener system used in SAGD operations typically uses salt dosages ranging from 15 to 25 lbs of sodium chloride salt per cubic foot of resin. This is equivalent to 240 to 400 grams of NaCl per liter of resin or equivalent to 4100 to 6800 meq of NaCl per liter of resin.

Thus the maximum ratio of NaCl used to regenerate the softener to the Total Hardness removed by the softener is equal to 6800 meq NaCl 1900 meq TH=7.5 to 1.

Part B

A Steam Assisted Gravity Drainage system having a Once-Through Steam Generators (OTSGs) as discussed in Part A above, but using the brine recovered from the blowdown stream from the OTSG via the steam/water separator unit as described herein:

All hardness removed by the SAC resin results in the release of an equivalent amount of sodium into the treated water. Thus, sodium chloride in effluent from softener is calculated as follows:

(76+3)meq/l×300 BVs=23,700 meq of NaCl per liter of resin.

Thus the ratio of NaCl in the effluent to the Total Hardness removed by the softener is equal to: 23,700 meq NaCl/900 meq TH=26.3 to 1.

The quantity of salt computed above is recoverable for softener regeneration via the blowdown stream from the steam/water separation unit positioned downstream of the OTSG.

Comparison

It is readily apparent that the quantity of salt available in the blowdown from the OTSG is about 3.5 times higher than used in the conventional softening system. This extra salt can be used to regenerate the SAC resin to a much greater level of regeneration efficiency with the corresponding benefits of achieving even lower hardness leakage levels than can be achieved with the conventional softener system.

Figure 5:
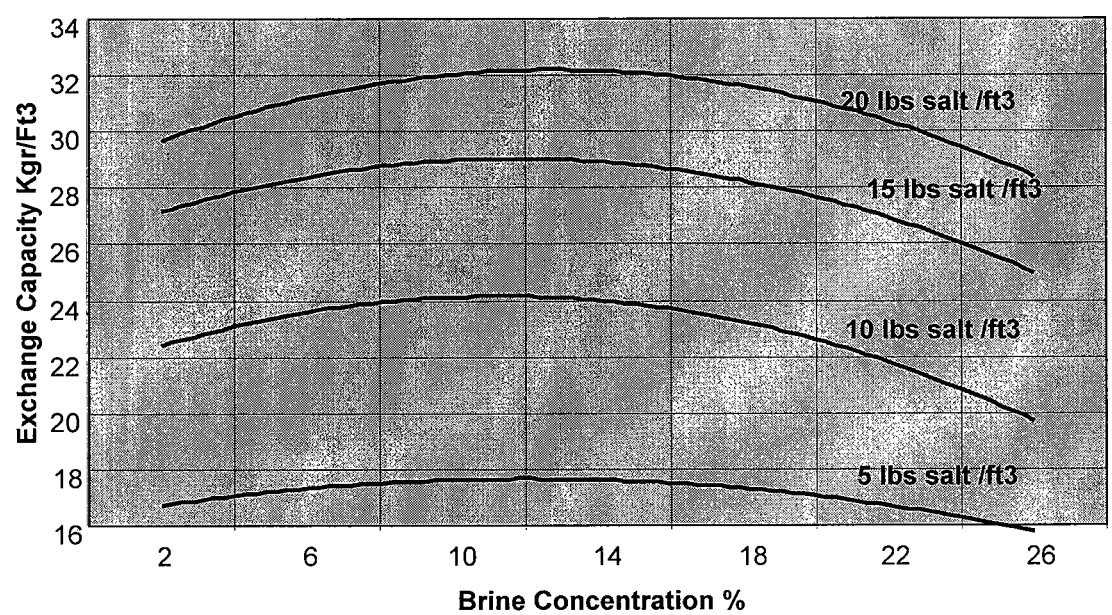
FIG. 5 shows four SAC type ion exchange resin (Purolite C100, C100E, SST60, SST80) (sodium cycle) and the effect of brine concentration on exchange capacity

Conventional softener systems use a brine concentration of 10% by weight (1832 meq of or higher for best efficiency. This concentration is significantly higher than the concentration of brine that can be recovered from the blowdown water from the OTSG. The effluent concentration of the salt from the softener (79 meq/l as above) is concentrated 5 times (to a value of 395 meq/) by the salt concentrating mechanism of the OTSG and steam/water separator unit since the blowdown comprises ⅕ of the water volume fed to the OTSG. Thus the brine concentration in this case is about 2% instead of the usual 10% recommended and some loss in efficiency can be expected if used for a conventional softener system. FIG. 5 show that, for a dosage range of 15 to 20 lbs salt/ft³ of resin, the loss in regeneration efficiency is no more than 7%.

Considering that the equivalent salt dosage using the OTSG blowdown is 3.5 times higher than that for the conventional softener operation, and that all the salt is available for subsequent regeneration of the softener, it is quite apparent that the lower brine concentration will not have any material impact on the overall capacity achieved. In fact, the 3.5 times higher salt dosage amounts in this case to an equivalent salt dosage in excess of 80 lbs salt per cubic foot of resin which will result in extremely efficient regeneration of the softener as well as a higher operating capacity.

The table below is a convenient summary and comparison of the more salient facts of operation of a conventional softener versus a softener using brine recovered from the blowdown of the OTSG:

| Parameter | Conventional Softener | Exemplary Softener of the invention |
|---|---|---|
| Hardness influent - meq/l water | 4 | 4 |
| Hardness capacity of resin - meq/l of resin | 900 | 900 |
| Salt Dosage - lbs/ft3 | 25 | 86 |
| Salt Dosage - meq/liter of resin | 6800 | 23700 |
| Brine concentration | 10% | 2% |
| Hardness leakage - ppm as $CaCO_3$ | <50 | <<50 |

Example 2

A Steam Assisted Gravity Drainage system having a Once-Through Steam Generators (OTSGs) has the following parameters:

Influent water TDS—4000 ppm as $CaCO_3$;
Sodium chloride content—3800 ppm as $CaCO_3$ (76 meq NaCl per liter);
Total Hardness—200 ppm as $CaCO_3$ (4 meq total hardness per liter of water);

It is desired to calculate the minimum hardness leakage possible when the softener is operated counterflow with the service water and regenerant brine entering the softener vessel in opposite directions. Thus, leakages for with various grades of salt versus regenerating the softener with the brine from the OTSG blowdown can be compared. Rock salt, solar salt and vacuum salt are compared in the table below with the use of the OTSG blowdown brine as a regenerant. Rock salt, solar salt and vacuum salt are compared at 10% brine concentration with the typical hardness levels for these grades versus OTSG brine available at 2% concentration with a maximum hardness level of 1 ppm as $CaCO_3$. The hardness concentration assumed for the OTSG brine is based on the maximum hardness specification for the softened water of 0.2 ppm after the 5 times concentration of the hardness in the OTSG boiler while the 2% brine concentration is based on 5 times concentration of the influent TDS at 4000 ppm.

Using equation (4) discussed earlier, the minimum hardness leakage possible after regeneration with each of the above brine regenerants is calculated in the table below:

| Salt | % Brine | Total Hardness as ppm $CaCO_3$ in the brine | Minimum TH Leakage from Softener in Counterflow operation ppm as $CaCO_3$ |
|---|---|---|---|
| Rock salt | 10% | 1606 | 8.2 |
| Solar salt | 10% | 547 | 2.7 |
| Vacuum salt | 10% | 273 | 1.4 |
| OTSG Blowdown | 2% | 1 max. | 0.04 |

It is apparent that the minimum hardness leakage expected by using the OTSG brine as the softener regenerant is at least an order of magnitude lower than the minimum hardness that can be produced with the best grade of commercially available salt.

Another major point worth noting is that the calculated leakage exiting the softener at 0.04 ppm is just a fraction of the assumed hardness leakage of 0.2 ppm (1 ppm after 5 times concentration in the OTSG). Since the hardness leakage exiting the softener is directly responsible for the hardness concentration in the OTSG brine, it is obvious that the assumption of 0.2-ppm leakage exiting the softener is very conservative.

Example 3

A Steam Assisted Gravity Drainage system having a Once-Through Steam Generators (OTSGs) has the following parameters:
Influent water TDS—12000 ppm as $CaCO_3$;
Sodium chloride content—11700 ppm as $CaCO_3$ (234 meq NaCl per liter);
Total Hardness—300 ppm as $CaCO_3$ (6 meq total hardness per liter of water);

A twin alternating softener system that uses the OTSG brine as regenerant is designed so one softener will be in service, softening the influent water, while the other will be simultaneously regenerated using brine recovered via the OTSG blowdown. The system is designed to provide maximum hardness leakage of 0.2 ppm.

The solution uses a counterflow operated twin tank softener system with flow characteristics as shown in FIG. 4, in which SAC 1 is in service softening the influent water while SAC 2 in being regenerated with the cooled blowdown brine from the OTSG. The valving and control system (36) is designed to switch SAC 1 out of service and into regeneration while simultaneously switching SAC 2 from regeneration and into service.

While an excess of salt is available from the OTSG blowdown brine, it is important to control and confine the loading of hardness on the resin bed on a fraction of the resin bed that is at the inlet of the raw water that is being softened. It is also necessary to use accepted practice for vessel configuration, and resin bed depth so ensure that hardness loading on the resin stays sufficiently toward the inlet end of the resin bed. The frequency of switching of the two vessels must therefore be sufficiently often so that no extra raw water hardness slips through the resin bed other than hardness loaded on the resin when the brine was passed through the resin bed in the opposite direction to the entry of the raw water. This will ensure that any hardness leakage from the softener is due only to hardness in the regenerant brine.

In practice, the bed depth must conform with that used in standard counterflow designs with deeper beds preferred due to better control of hardness slippage. A bed depth of at least 1.2 meter is preferred.

The maximum loading capacity of the standard cation resin for influent conditions above of TDS of 12000 ppm as $CaCO_3$ and hardness of 300 ppm as $CaCO_3$ is calculated from equation 4 as equal to 600 meq TH per liter of resin or a total of 100 bed volumes capacity to completely saturate the resin bed with hardness.

Figure 6:
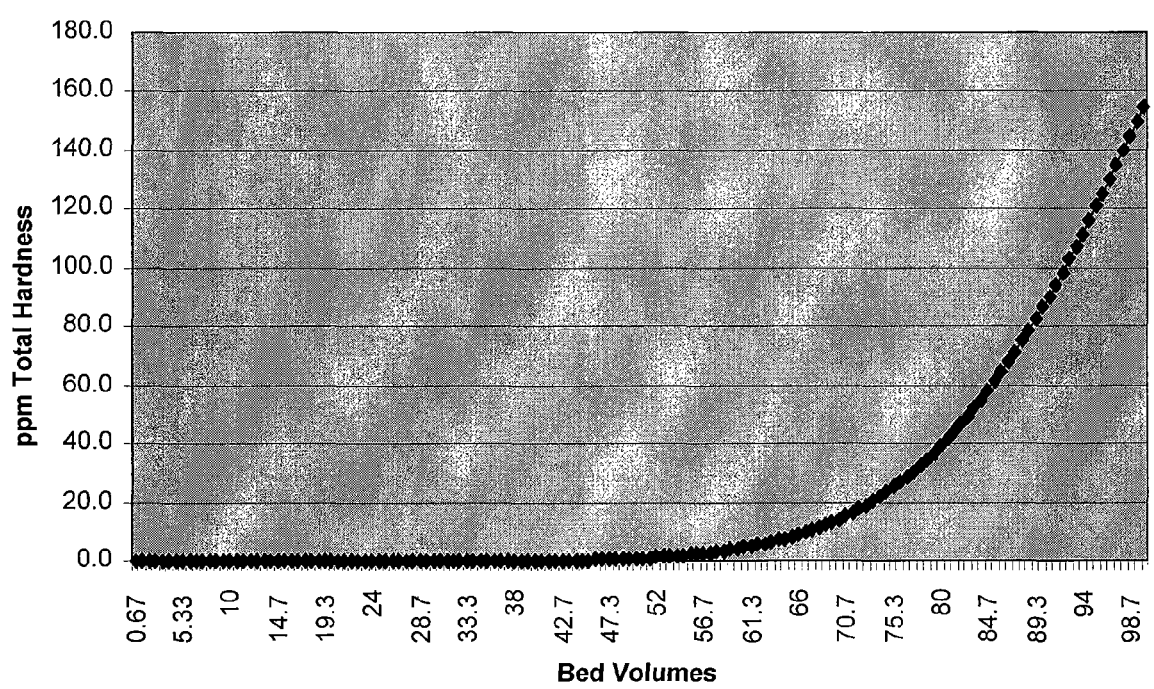
FIG. 6 shows the predicted breakthrough of total hardness for a standard SAC in virgin condition (influent TDS 12000 ppm as $CaCO_3$, TH of 300 ppm as $CaCO_3$, predicted on an ion exchange simulation program (IX-SIMULATOR, Purolite).

Breakthrough of total hardness to 0.2 ppm in the effluent from the resin bed (bed depth 1.2 meters) at 42 bed volumes of loading is estimated using an ion exchange simulation program (IX-SIMULATOR, Purolite). The output of the simulator program is shown in FIG. 6.

Thus under ideal conditions, the hardness in the treated water will not exceed 0.2 ppm until 42 bed volumes of raw water has been treated.

A conservative design for the twin alternating softener system would therefore include switching of the softeners from service to regeneration at a volumetric capacity that is somewhat lower than 42 BVs, preferably at after 20 BVs have been treated. At a typical service flowrate of 20 bed volumes per hour this would require the vessel switching mechanism to be activated once every hour, switching the service vessel into regeneration mode and the other vessel into service mode.

Achieving a hardness leakage of 0.2 ppm as $CaCO_3$ with a single SAC vessel essentially achieves the specification hardness for the OTSG, making the installation of a polisher vessel designed to further reduce the hardness unnecessary under ideal conditions. Since operating conditions in the oil field are seldom ideal, and upsets in the pretreatment can cause fouling of the resin by oil, suspended solids, and even microbiological growth, it would be prudent to consider installation of polisher vessels as extra insurance in meeting the hardness specification.

One exemplary alternating softener system that may be modified to use the OTSG brine or produced water as a regenerant in accordance with Example 3 is the Marlo triple system MR Series water softener (Marlo Inc., Racine Wis.).

Similarly, the SSZ sodium cycle water softeners (Crown Solutions, Vandalia, Ohio) may be modified to use with the present invention.

The entire disclosures of all applications, patents and publications, cited herein are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of regenerating resin in an ion exchange water softener in a system containing a Once-Through Steam Generator (OTSG) and an ion exchange water softener comprising:
recovering water concentrated as a blowdown stream from the OTSG, and regenerating the resin in the ion exchange water softener by flowing the blowdown stream through the ion exchange water softener wherein the blowdown stream has a brine concentration of from 1 to 2.5% and a calcium hardness of less than about 1 ppm and wherein the resin comprises a strong acid cation resin.

2. The method of claim 1, wherein the ion exchange water softener is a sodium cycle water softener.

3. The method of claim 1, further comprising reducing the temperature of the blowdown stream using a heat exchanger prior to regenerating the resin.

4. The method of claim 3, wherein the temperature of the blowdown stream is reduced to less than 95° C.

5. The method of claim 1, wherein the system containing the OTSG and the ion exchange water softener does not contain a lime softener.

6. The method of claim 1 wherein the resin is a shallow shell resin.

7. The method of claim 1, wherein the resin is a macroporous polystyrene resin crosslinked with divinylbenzene having sulphonic acid functional groups.

8. The method of claim 1, wherein the resin is a gel polystyrene resin crosslinked with divinylbenzene having sulphonic acid functional groups.

9. The method of claim 1, wherein the ion exchange water softener has less than 1.0 ppm hardness leakage after regenerating the resin in the ion exchange water softener.

10. The method of claim 9, wherein the ion exchange water softener has less than 200 ppb hardness leakage after regenerating the resin in the ion exchange water softener.

11. The method of claim 9, wherein the ion exchange water softener has less than 50 ppb hardness leakage after regenerating the resin in the ion exchange water softener.

12. The method of claim 1, wherein regenerating the resin comprises regenerating in a counter-flow mode.

13. The method of claim 1, wherein regenerating the resin comprises regenerating in a co-flow mode.

14. The method of claim 1, wherein the system comprise at least two water softener vessels, wherein the water softener vessels are operated in an alternating mode.

15. A method of regenerating resin in an ion exchange water softener comprising:
recovering water concentrated as a blowdown stream from a Once-Through Steam Generator (OTSG); and
regenerating the resin in the ion exchange water softener by flowing the blowdown stream through the ion exchange water softener,
wherein the blowdown stream has a brine concentration of from 1 to 2.5% and a calcium hardness of less than about 1 ppm and wherein the resin comprises a strong acid cation resin.

16. The method of claim 15, wherein the resin in the ion exchange water softener is in fluid communication with the Once-Through Steam Generator.

17. A method for reducing the amount of salt additives and wastewater in a steam-based enhanced oil recovery process, wherein the process includes an ion exchange water softener and a Once-Through Steam Generator (OTSG) comprising:
recovering water concentrated as a blowdown stream from the OTSG, and
regenerating the resin in the ion exchange water softener by flowing the
blowdown stream through the ion exchange water softener, wherein the blowdown stream has a brine concentration of from 1 to 2.5% and a calcium hardness of less than about 1 ppm and wherein the brine is obtained only from the blowdown stream and wherein the resin comprises a strong acid cation resin.

18. The method of claim 15, wherein the resin in the ion exchange water softener is indirectly connected to the Once-Through Steam Generator.

19. A method of regenerating a strong acid cation exchange resin in a system comprising a Once-Through Steam Generator (OTSG), comprising:
providing a brackish or produced feed water having a total dissolved solid content of greater than 2000 ppm and a hardness content of from 50 to 500 ppm;
flowing the brackish or produced water through the cation exchange resin so that the hardness content of the brackish or produced water is reduced to less than about 0.2 ppm in a single ion exchange softening cycle;
directing the water exiting the cation exchange resin into a OTSG;
collecting a blowdown stream from the OTSG, the blowdown stream having a hardness content of less than 1 ppm;
flowing the blowdown stream through the cation exchange resin to regenerate the resin,
wherein the blowdown stream is at least 5% of the total feed water, the concentration of brine in the blowdown stream is from 1 to 2.5%, and wherein the volume of water flowing through the cation exchange resin system before each regeneration of the resin is no more than 40 times the volume of the cation exchange resin and wherein the resin comprises a strong acid cation resin.

20. The method according to claim 19, wherein the hardness content of the OTSG blowdown stream is less than 1 ppm.

* * * * *